US006656406B2

(12) United States Patent
Parrinello

(10) Patent No.: US 6,656,406 B2
(45) Date of Patent: Dec. 2, 2003

(54) METHOD FOR DECORATING THE TOP OF A CONTAINER CLOSURE CAP

(75) Inventor: Fiorenzo Parrinello, Medicina (IT)

(73) Assignee: SACMI - Cooperative Meccanici Imola-Soc. Coop. a.R.L., Imola (IT)

( * ) Notice: Subject to any disclaimer, the term of this patent is extended or adjusted under 35 U.S.C. 154(b) by 223 days.

(21) Appl. No.: 09/747,027

(22) Filed: Dec. 26, 2000

(65) Prior Publication Data
US 2001/0013671 A1 Aug. 16, 2001

(30) Foreign Application Priority Data
Dec. 23, 1999 (IT) .................................. RE99A0140

(51) Int. Cl.[7] .......................... B29C 43/04; B29C 43/18
(52) U.S. Cl. ..................... 264/268; 264/259; 264/267; 264/278; 264/320; 264/322
(58) Field of Search ................. 264/259, 267, 264/268, 271.1, 275, 278, 319, 320, 322

(56) References Cited

U.S. PATENT DOCUMENTS

| 3,427,688 A | * | 2/1969 | Wilson ........................ 249/83 |
| 3,547,746 A | * | 12/1970 | Gwinner ..................... 215/230 |
| 3,557,030 A | * | 1/1971 | Simons ............... 260/DIG. 42 |
| 4,122,147 A | * | 10/1978 | Vrcelj ........................ 264/255 |
| 4,224,275 A | * | 9/1980 | Sauer ........................ 264/516 |
| 4,274,822 A | * | 6/1981 | Tamai et al. ................. 264/268 |
| 4,312,824 A | * | 1/1982 | Mori et al. .................. 264/135 |
| 4,354,996 A | * | 10/1982 | Nishiyama et al. ......... 264/322 |
| 4,388,058 A | * | 6/1983 | Kubo ......................... 425/110 |
| 4,459,092 A | * | 7/1984 | Hatakeyama ............... 425/112 |
| 4,497,765 A | * | 2/1985 | Wilde et al. ................ 215/252 |
| 4,545,752 A | * | 10/1985 | Hanamoto et al. .......... 425/112 |
| 4,649,013 A | | 3/1987 | Yamamoto et al. |
| 4,777,003 A | * | 10/1988 | Baiborodov et al. ........ 264/127 |
| 5,037,595 A | * | 8/1991 | Kornelis ..................... 264/153 |
| 5,053,179 A | | 10/1991 | Masui et al. |
| 5,160,687 A | | 11/1992 | Margaria |
| 5,551,141 A | * | 9/1996 | De'Ath et al. .............. 264/267 |
| 5,947,311 A | | 9/1999 | Gregory |
| 5,961,911 A | * | 10/1999 | Hwang et al. .............. 264/268 |

FOREIGN PATENT DOCUMENTS

| EP | 0 073 334 | 3/1983 |
| EP | 0 336 269 | 10/1989 |
| EP | 2 703 029 | 9/1994 |
| EP | 0 983 945 A1 | 3/2000 |

* cited by examiner

Primary Examiner—Angela Ortiz
(74) Attorney, Agent, or Firm—Browdy and Neimark

(57) ABSTRACT

Method for decorating the top of a compression-molded cap of synthetic material intended to close a container, in which the decoration is positioned on a flat support in the form of a disc which is placed in the cavity of the cap forming mold before the constituent material of the cap is introduced, and is found to be bonded to the top of the cap after its removal from the mold.

5 Claims, 6 Drawing Sheets

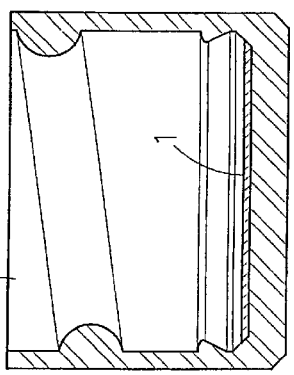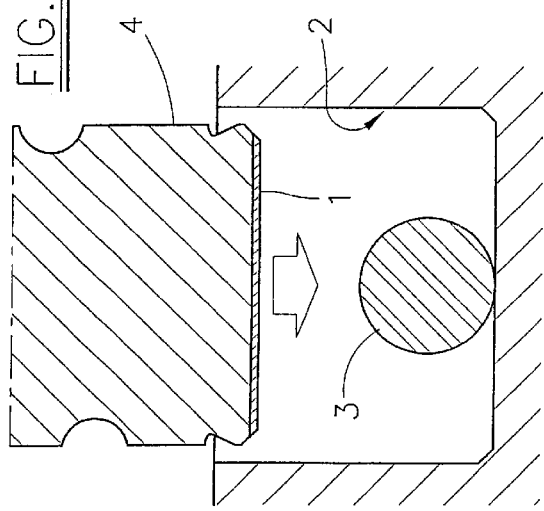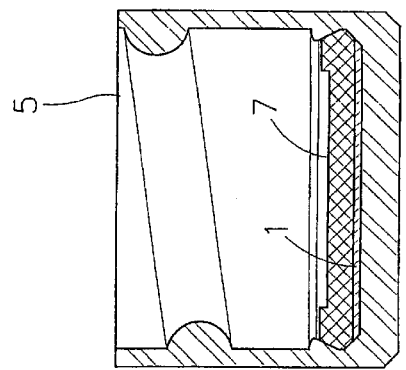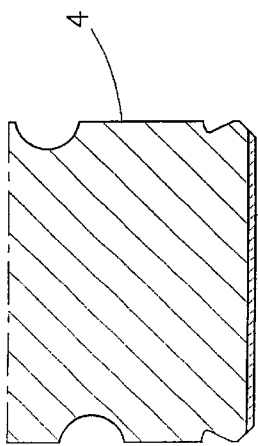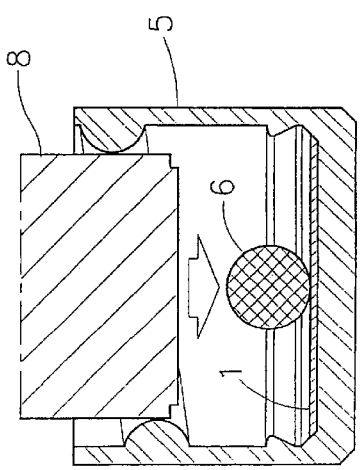

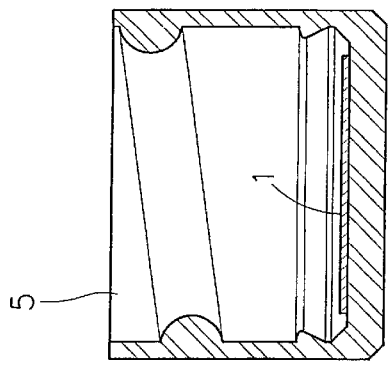
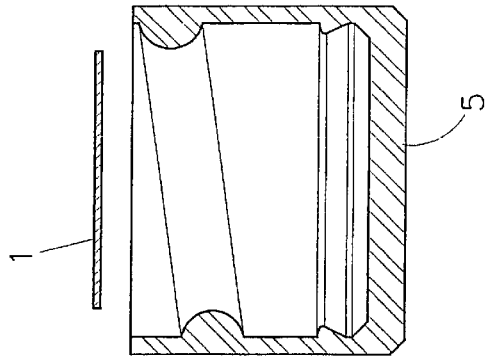
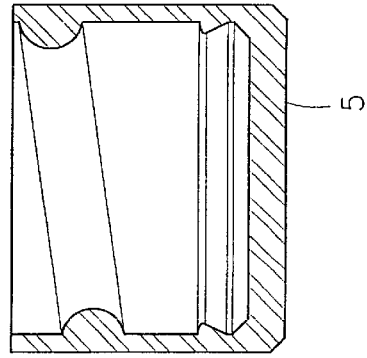
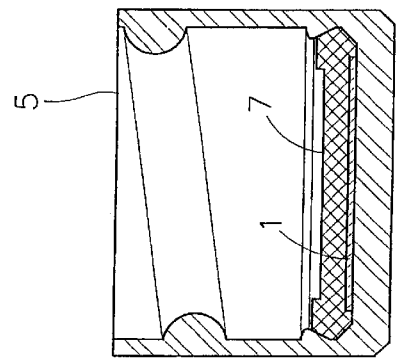
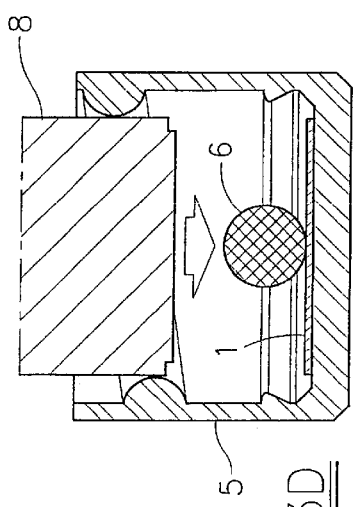

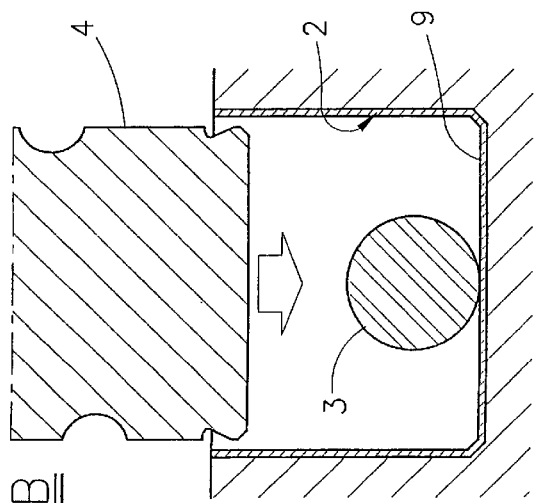
FIG.4A
FIG.4B
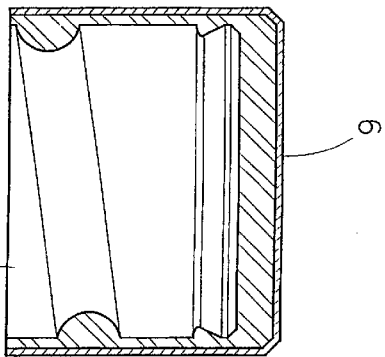
FIG.4C
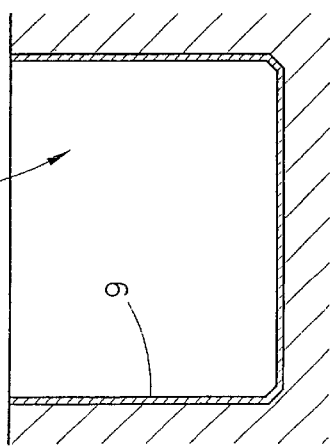
FIG.4D
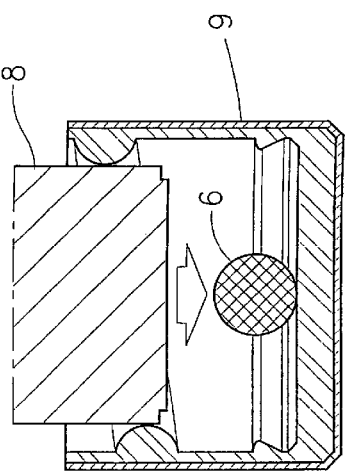
FIG.4E
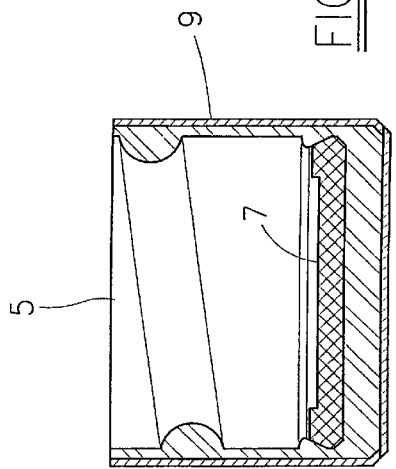

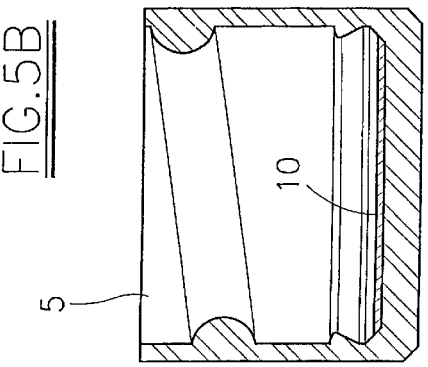
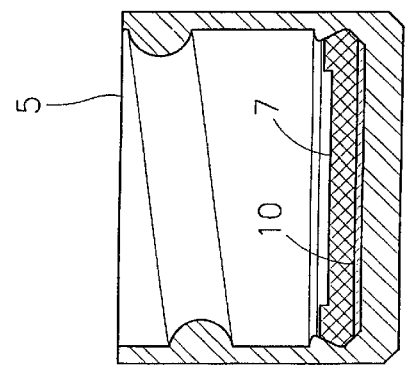
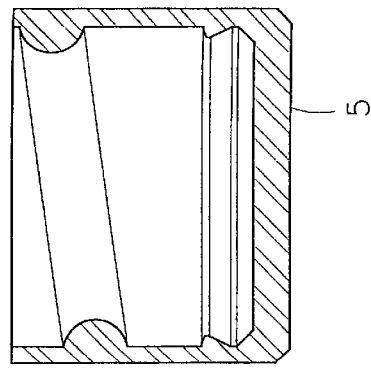
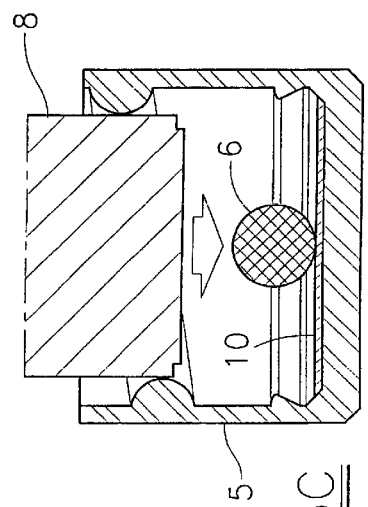

METHOD FOR DECORATING THE TOP OF A CONTAINER CLOSURE CAP

TECHNICAL FIELD

This invention relates to the decoration of stoppers of cap type obtained by moulding synthetic materials, such as the cap stoppers for example screwed onto bottles, also of synthetic material, for food of mineral water, drink or similar type.

In particular, the invention relates to stoppers of cap type obtained by hot compression moulding.

BACKGROUND ART

These stoppers generally have to be decorated on their flat top by silk-screen printing or other known systems. The application of the decorations, generally consisting of the manufacturer's trademark or other writing explaining the quality of the product contained in the bottle, is an operation rendered complicated by the actual shape of the stopper, with substantial incidence on its final cost.

The decorations applied in this manner are also exposed to external agents, or to impact and abrasion, and are often very precarious with time.

In the case of caps obtained by an injection process, to overcome the aforesaid drawbacks it has been proposed to insert a covering disc directly into the mould forming the caps by the injection process.

An example of this method is illustrated in Italian Patent Application 67297 A/88 in the name of ALPLAST.

However the known art has limitations of both a constructional and implementational character which considerably limit, if not practically negate, its execution.

Firstly the known method is applicable only to injection moulding processes, and is in no way compatible with modern hot compression moulding processes which are gradually surplanting the former.

Lastly, with the known method, if the disc comprises more than one layer of material, it must be previously and separately formed prior to its insertion into the mould.

An object of the invention is to decorate the top of the closure cap by a compression process in an economical and secure manner, at reduced cost.

A further object of the invention is to apply decoration which is protected from the external agents, and is hence stable with time.

A further but not less important object of the invention is, simultaneously with the formation of the decoration, or separately therefrom, to form a barrier both against undesirable agents present in the atmosphere, and against gases present in the container, for example $O_2$, to prevent their migration to the outside via the cap.

DISCLOSURE OF THE INVENTION

These objects are attained, according to the invention, by prearranging the decoration on an appropriate support in the form of a single-layer disc, which is inserted into the stopper-forming mould, either into the female part or into the male part, then proceeding with the forming process in the usual manner.

The disc carrying the decoration can be associated with layers which form the said barrier, and can be positioned within the mould in such a manner as to be incorporated into the roof of the cap. The various layers to be applied by the process of the invention can also be applied to the cap independently of the disc, without the need to preconstruct a multi-layer disc.

The material of the support constituting the disc is preferably the same as the constituent material of the stopper, or a material compatible therewith.

A convenient adhesive or a bonding aid can be provided on that side of the support which is to come into contact with the top of the stopper.

According to the invention, one or more of the layers associated with the disc can be formed by coating.

The invention will be more apparent from the summary description of the compression moulding process.

With this process, a portion of synthetic material, such as propylene homopolymer or copolymers thereof, high density polyethylene, or the like, are fed in the plastic state into the cavity of a suitably temperature-controlled mould.

Insertion of the punch obliges the material to run into the interspace created between the punch and cavity, until filled. The shape of the cavity and punch are mutually complementary, to create the outer and inner shape of the cap respectively.

On opening the mould the cap remains mounted on the punch, from which it is expelled in various ways, all known.

The method and the means used in compression moulding are well known to the expert of the art, and will therefore not be further described.

According to the invention, a decorated support is inserted onto the base of the mould cavity, before introduction of the portion of synthetic material which is to form the cap.

Conveniently the decoration faces the cavity interior.

The material of the decoration support disc is conveniently the same as the cap material, however solutions can be envisaged using different materials, the material being transparent, and hence when the cap has been formed the decoration is visible but protected against external agents.

The decoration can be applied to the support by known methods, such as silk-screen printing, offset printing or other methods.

The invention also provides for the application of a support formed from more than one layer, in which case these adhere perfectly one to the other, even if the decoration is present on their interface.

If the cap is intended to seal liquids containing volatile elements, such as $CO_2$, the invention comprises a layer, usually intermediate, which forms a barrier against these gases, or against possible other gases of organic type.

This gas-impermeable layer is a material selected from PVDC (polyvinylidenechloride); PA (polyamide); EVOH (polyvinylalcohol); PET (polyethyleneterephthalate); PEN (polyethylnaphthenate); aluminium in sheet form or metallized in situ, or metallized on a support (for example on a polypropylene support); or polypropylene supports with a layer of silicon oxides.

Many other materials are however suitable for forming the barrier. The impermeable layer can be applied in situ or, as is fairly common, can be on a support or inside this support.

As the constituent materials of said impermeable layer are often incompatible with the cap material, a layer is often provided which makes adhesion possible between the impermeable layer and the adjacent surface of the cap material, this layer being generally known as a tie layer.

The adhesive layer generally consists of particular copolymers having chemical characteristics intermediate between the two layers, and of which the nature depends on the layers themselves. In some cases, such as a silicon oxide layer on a PP support, an adhesive layer between the support and the oxide is unnecessary. In this respect, processes are known (such as in this case deposition by plasma treatment), in which the surface of the support is modified (by this treatment), followed by deposition of silicon oxide.

In these cases, if direct adhesion of the silicon oxide to the cap is required, an adhesive layer must be inserted.

It is interesting to note that in the case of a polypropylene substrate covered with silicon oxide (or metallized) the adhesive layer can be dispensed with if the polypropylene part of the disc directly faces the plastic.

If the disc is positioned on the outside of the cap, the part characterising the barrier is subjected to abrasion, this being a negative factor. If however the disc is positioned in the cap interior, the adhesion problem is eliminated. Hygroscopic materials, such as EVOH, which exhibit their barrier characteristics as the retained moisture increases, cannot be used as external barrier materials. These materials exhibit their function when positioned within structures with superior moisture barrier properties.

In general, however, it is preferable for the barrier layers, whether hygroscopic or not, to be positioned between other layers. The choice of the type of adhesive is strongly influenced by the substrates to be treated. The adhesive layer is also used inside the substrate to provide adhesion between the various substrates. For example, adhesion between a PP and an EVOH layer can be achieved by using PPgMAH (polypropylene grafted with maleic anhydride), LDPEgMAH (low density polyethylene grafted with maleic anhydride), or LLDPEgMAH (low density linear polyethylene grafted with maleic anhydride).

For the most outer layer, instead of the polypropylene or copolymer film, a film of plastic material other than PP can be used, such as PET, PEN etc., or a varnish or lacquer layer applied directly on the underlying layer of gas impermeable material.

The varnish or lacquer is applied by usual methods, for example by offset, silk-screen or tampographic printing methods, or the like. For the most inner layer, ie that intended to come into contact with the cap, a compatible material can be conveniently used instead of the material identical to that with which the cap is formed.

For example, if the cap material is polypropylene, SBS (styrene butadiene styrene) rubber or SEBS (styrene ethylene butadiene styrene) rubber can be used for the inner layer.

For the most inner layer, a plastic material based on ULDPE (ultra-low density polyethylene) can be used. What is important is the compatibility of the material of the inner layer with the material of the cap.

In this respect, when the two materials are compatible, adhesion is possible between them by microfusion (this occurring during moulding of the cap) and consequent bonding of the top of the inner layer in contact with the cap.

A multi-layer decoration support can also be formed from a metal intermediate layer, for example aluminium, having a thickness of between 0.01 mm and 0.1 mm, which can carry the decoration in the form of a lithograph, a silk-screen print or the like, and lies between two layers formed by varnishing or coextrusion.

Various examples of caps constructed by the method of the invention are described hereinafter by way of non-limiting example, and illustrated in the figures of the accompanying drawings, in which:

BRIEF DESCRIPTION OF DRAWINGS

FIGS. 2A to 2E show a second embodiment of the method.

FIGS. 3A to 3E show a third embodiment of the method.

FIGS. 4A to 4E show a fourth embodiment of the method.

FIGS. 5A to 5D show a fifth embodiment of the method.

DETAILED DESCRIPTION OF EMBODIMENTS

With reference to FIGS. 1A to 1E, these show a disc 1 of transparent monomaterial, one side of which is printed by usual means, such as silk-screen, tampography or inking.

The disc thickness is between 0.01 mm and 0.4 mm, preferably at least 0.03 mm to obtain better mechanical resistance to its positioning and moulding, and not greater than 0.3 mm for cost limitation reasons.

Said disc is rested on the base of the mould cavity 2 by mechanical means, with that side carrying the printing and intended to come into contact with the top of the cap facing the interior of the cavity.

Figure 1C:
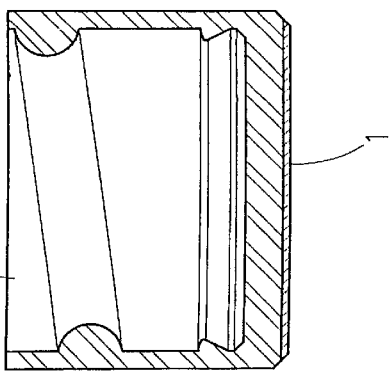
FIGS. 1A to 1E show a first embodiment of the method.

When the disc has been positioned, a quantity of synthetic material 3, for example polypropylene, in a softened state, in placed in the cavity and the punch 4 is then lowered (FIG. 1B) to cause the synthetic material to run into the interspace between the punch and cavity, and form the cap 5 (FIG. 1C).

The disc 1 is separated from a film which is decorated continuously.

The portion of propylene destined to form the cap is at a temperature generally greater than 165° C., and is therefore practically in the molten state, and melts the constituent film of the support, or at least the interface between the support and cap, so that the two materials adhere to each other.

The force of adhesion of the support to the cap increases with the temperature of the portion of molten polypropylene which is to form the cap, and remains virtually constant for a portion and then decreases slowly. The temperature up to which adhesion increases and the temperature from which adhesion decreases depend on the type of material, its fluidity, any additives, its thermal stability, and the material of the support disc.

The force of adhesion is also proportional to the moulding pressure, which can reach 10,000 bar.

However, on reaching a predefined pressure the force of adhesion remains constant. This pressure is a function mainly of the viscosity and temperature of the polypropylene.

The time for which the pressure is maintained also positively influences the adhesion force, until a value is reached beyond which it becomes of no influence.

This value can be indicatively between 0.1 and 10 seconds, the value depending mainly on the material, the cap thickness and the cap cooling rate.

In controlling the process, care was taken to obtain sufficient adhesion of the support before decreasing the mould temperature to cause solidification of the cap necessary for its formation.

The formed cap has a decorated top, without any material discontinuity being apparent between it and the support.

Figure 1E:
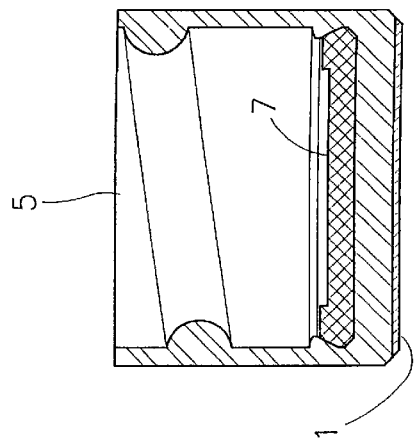
Figure 1B:
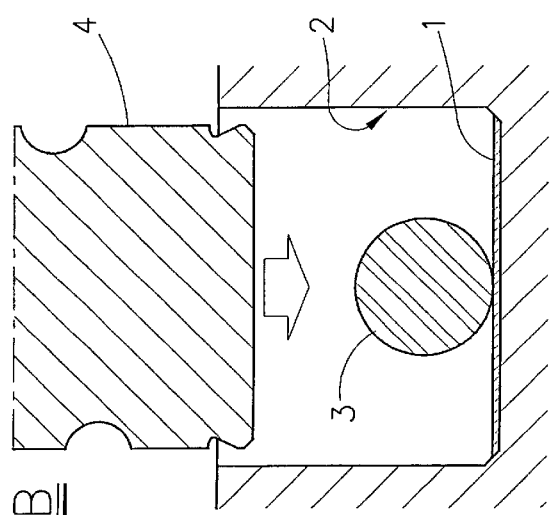
Figure 1D:
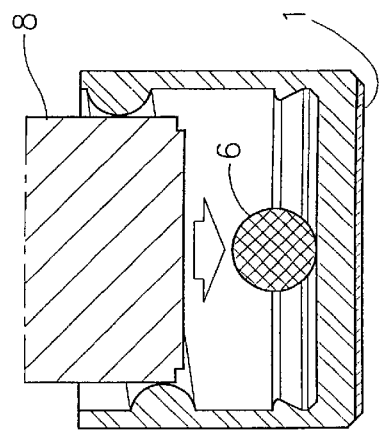
Figure 1A:
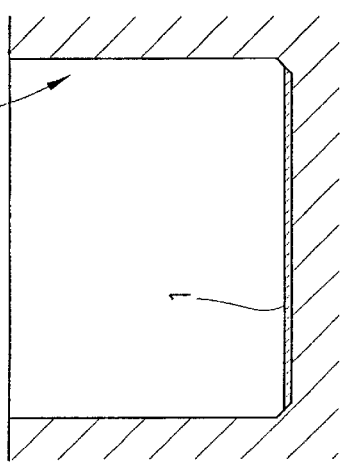
Figure 6A:
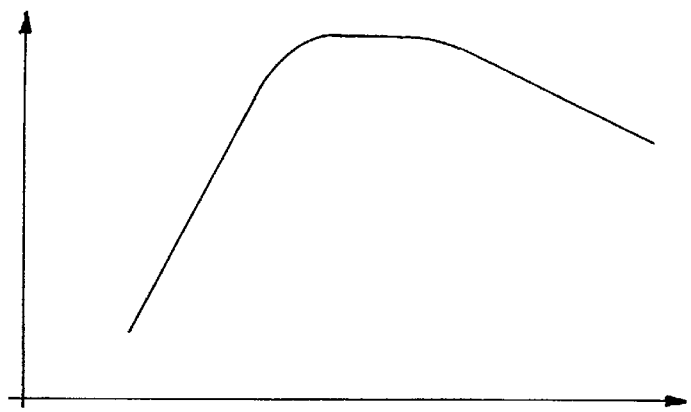
FIG. 6A is a diagram showing the force of adhesion of the support as a function of temperature.
Figure 6B:
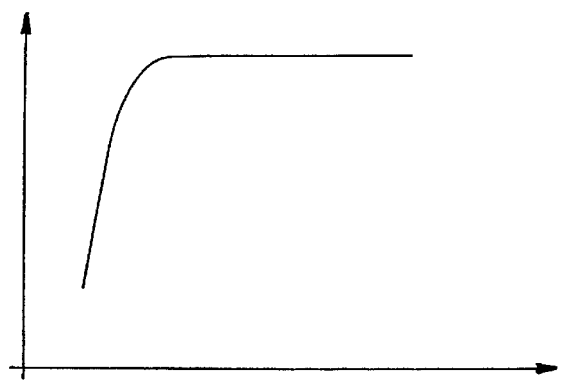
FIG. 6B is a diagram showing the force of adhesion of the support as a function of the contact time.
Figure 6C:
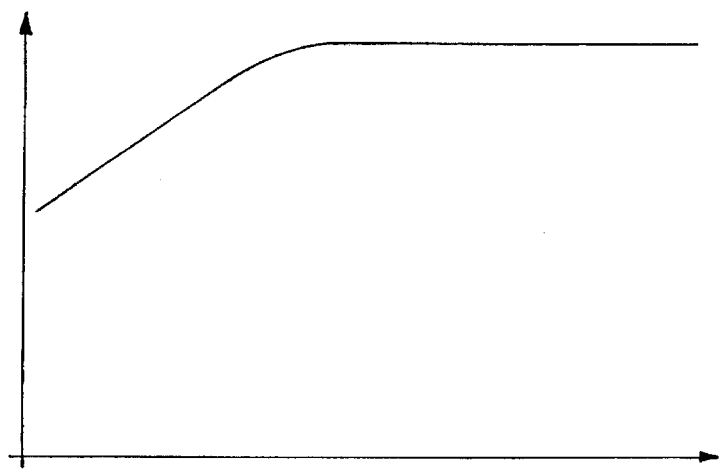
FIG. 6C is a diagram showing the force of adhesion of the support as a function of the pressure within the mould.

As can be seen from FIGS. 1D and 1E, a portion 6 of material able to create a gasket 7 is then inserted into the already formed cap with its print-carrying disc 1, and is subjected for compression-moulding to the action of a punch 8. Sometimes an inserted gasket is preferred.

In the embodiment shown in FIGS. 2A to 2E, the procedure as in the embodiment of FIGS. 1A to 1E is followed, with the only difference that the disc is applied to the base of the punch 4 and retained by electrostatic or pneumatic means. In this case, if the gasket is either inserted or non-adherent to the disc, the invention is suitable as an excellent vehicle for prize-offering promotion campaigns or competitions, as the result is immediately obtained by merely removing the gasket.

FIGS. 3A to 3E show an embodiment in which a disc 1 is inserted into a cap 5 already formed by compression moulding, as in the preceding cases, then by means of the portion 6 a gasket 7 is formed, as in the preceding case, its purpose being to maintain the disc 1 in position. In this case it is not essential to use as the disc material a material compatible polypropylene, as the purpose of the gasket is to maintain the disc in position.

In this case the disc can be decorated both on the side in contact with the cap, and on the opposite side.

If the disc adheres only to the gasket, or neither to the gasket nor to the cap, it becomes a possible vehicle for prize-offering promotion campaigns and competitions.

With reference to FIGS. 4A to 4E, the procedure as in the embodiment of FIGS. 1A to 1E is followed, but with the difference that into the mould cavity 2 there was inserted a cap 9 preformed for example by thermoforming a PVC, PET, PP or other film, which at the end of the process forms an outer covering for the cap 5 obtained by compression moulding.

The purpose of the preformed cap is to provide not only a more complex decoration but also a different feeling of the cap to the touch.

In the embodiment shown in FIGS. 5A to 5D, the procedure as in the embodiment of FIGS. 1A to 1E is followed, with the only difference that the disc 10, instead of being of polypropylene, consists of a layer obtained by varnishing operations effected directly on the inside or outside of the cap roof.

If the layer applied by the varnishing operation is located on the inside of the cap roof, it can be applied to an aluminium metal layer. This latter can be obtained by a metallization process. The decorations are arranged on the metal layer prior to varnishing.

These concepts can also be used for caps produced from thermoplastic materials other than polypropylene, such as high density polyethylene (HDPE), low density polyethylene (LDPE), polyethyleneterephthalate (PET), etc.

In the case of compatible supports, these must be chosen on the basis of the cap material. Different compatible materials based on the thermoplastic material considered are reported in the literature.

What is claimed is:

1. A method of decorating the top of a compression molded cap, during a compression molding process, comprising providing a preformed insert capable of fitting within a compression mold having a cavity and a punch, said preformed insert having a thickness between 0.01 and 0.3 mm, and having indicia thereon;

placing said preformed insert either within said cavity or on said punch;

inserting within said cavity a thermoplastic material in solid form, at a temperature less than its melting temperature; and inserting the punch into said cavity to form said cap and uniting said preformed insert with said thermoplastic so as to provide said cap with said indicia of said preformed insert without deformation of said insert.

2. A method of decorating the top of a compression molded cap during a compression molding process comprising providing a preformed insert capable of fitting within a compression mold having a cavity and a punch, said preformed insert having indicia thereon;

placing said preformed insert either within said cavity or on said punch;

inserting within said cavity a thermoplastic material in solid form at a temperature at which said thermoplastic material retains its solid form; and inserting the punch into said cavity to form said cap and uniting said preformed insert with said thermoplastic so as to provide said cap with said indicia of said preformed insert;

wherein said thermoplastic material has a melting or softening temperature greater than that of said preformed insert, and said uniting is carried out at a temperature at which at least an interface of said preformed insert adjacent said thermoplastic fuses, said temperature being at least 165° C.

3. The method of claim 2 wherein said preformed insert is a transparent disk and said indicia is reverse-printed text, and said disk is placed within said cavity with its reverse-printed surface facing the interior of the cavity.

4. The method of claim 1 wherein said preformed insert is a disk and said disk is held on said punch.

5. The method of claim 1 wherein said preformed insert comprises a thermoformed film of cap-shape, said insert being placed within said cavity.

* * * * *